No. 704,044. Patented July 8, 1902.
C. F. HUNTOON.
SIDE BEARING FOR RAILWAY CARS.
(Application filed Apr. 23, 1902.)
(No Model.) 2 Sheets—Sheet 1.
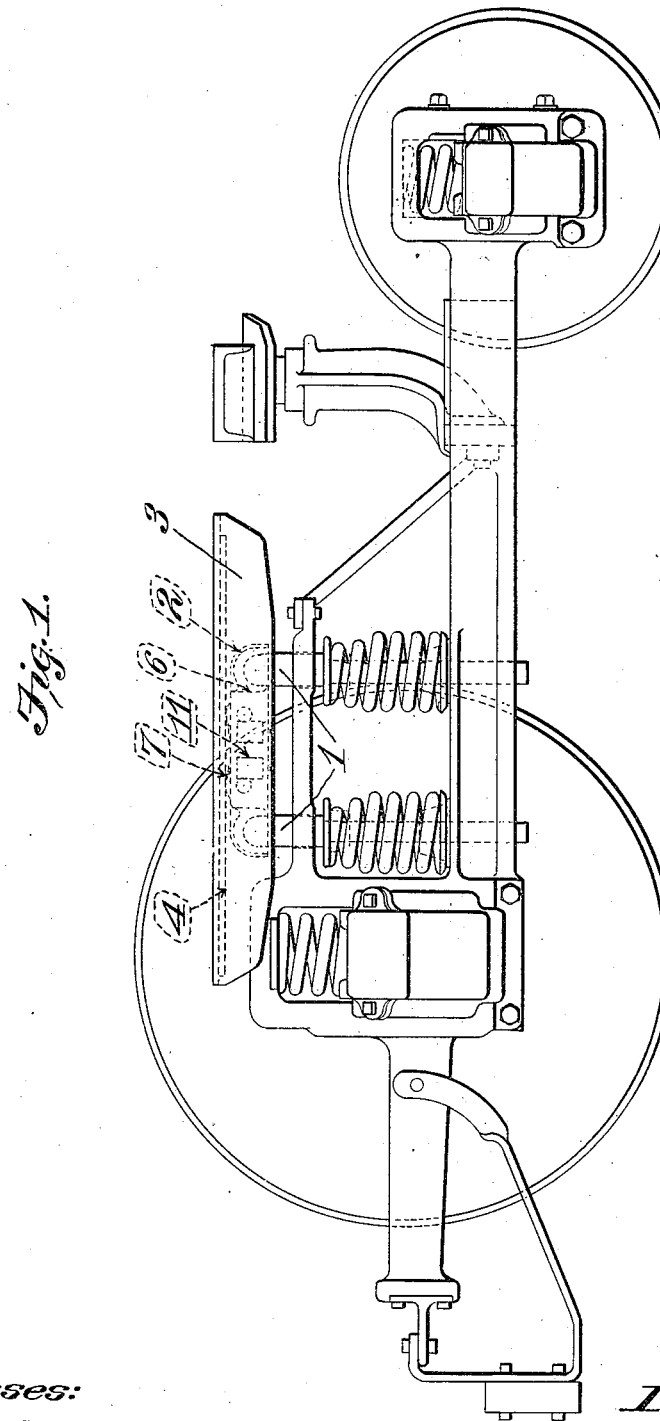
Witnesses:
G. A. Pennington
Ralph M. Ashby
Inventor:
Charles F. Huntoon,
by Bakewell & Cornwall
Attys No. 704,044. Patented July 8, 1902.
C. F. HUNTOON.
SIDE BEARING FOR RAILWAY CARS.
(Application filed Apr. 23, 1902.)
(No Model.) 2 Sheets—Sheet 2.
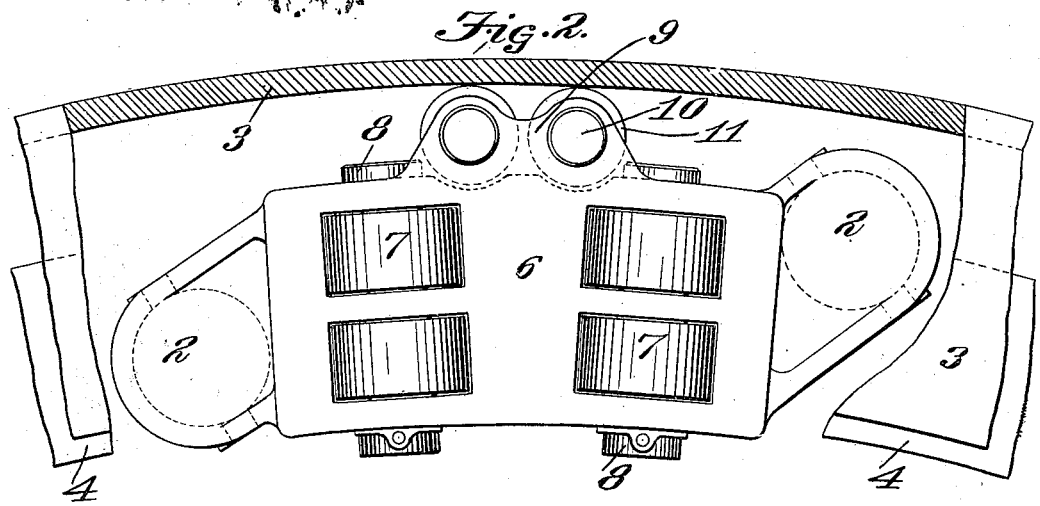
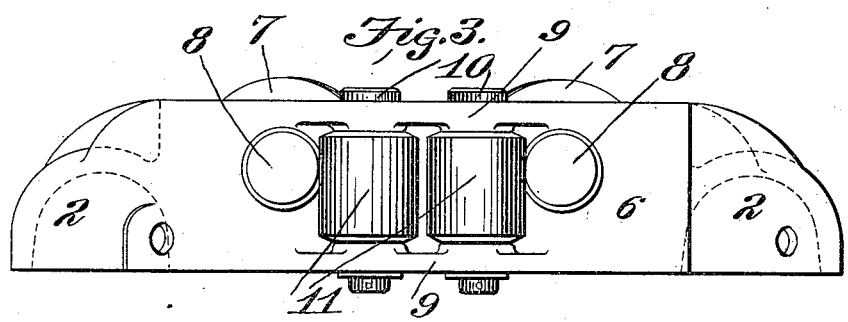
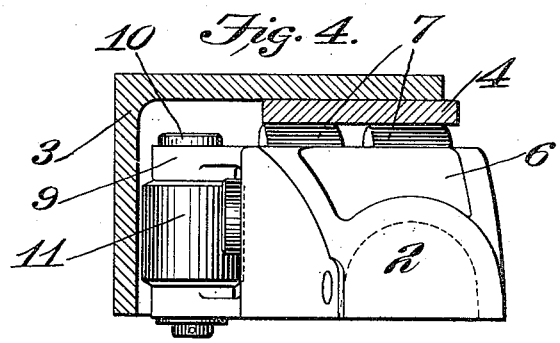
Witnesses:
G. A. Pennington
Ralph M. Ashby
Inventor:
Charles F. Huntoon,
by Bakewell & Cornwall
Attys

UNITED STATES PATENT OFFICE.

CHARLES F. HUNTOON, OF CHICAGO, ILLINOIS, ASSIGNOR TO CHICAGO RAILWAY EQUIPMENT COMPANY, OF CHICAGO, ILLINOIS, A CORPORATION OF ILLINOIS.

SIDE BEARING FOR RAILWAY-CARS.

SPECIFICATION forming part of Letters Patent No. 704,044, dated July 8, 1902.

Application filed April 23, 1902. Serial No. 104,312. (No model.)

*To all whom it may concern:*

Be it known that I, CHARLES F. HUNTOON, a citizen of the United States, residing at Chicago, Cook county, Illinois, have invented a certain new and useful Improvement in Side Bearings for Railway-Cars, of which the following is a full, clear, and exact description, such as will enable others skilled in the art to which it appertains to make and use the same, reference being had to the accompanying drawings, forming part of this specification.

This invention relates to a new and useful improvement in side bearings for railway-cars, the object being to provide an antifriction-bearing designed particularly for use in connection with that type of truck known as "maximum-traction" truck.

The special features of my present invention are the provision of rollers of antifriction devices in the upper face of the bearing for supporting the load combined with rollers or antifriction devices in some form to take the lateral thrust.

In the drawings, Figure 1 is a side elevational view of a maximum-traction truck, showing my improved side bearing in position thereon. Fig. 2 is a top plan view of my bearing. Fig. 3 is an elevational view as seen from the outside, and Fig. 4 is an end elevational view.

1 indicates what I have termed the "spring-posts" of the maximum-traction truck, whose upper ends are rounded and fit in sockets 2, provided at the ends of my improved side bearing, suitable pins holding the side bearing in position on the upper ends of said posts.

3 indicates an angle-iron secured to the body of the car, which angle-iron is curved to properly accommodate the swinging of the truck. The horizontal member of this angle-iron is provided with a wear or track plate, which track-plate is correspondingly curved. The curved angle-iron, which is secured to the body of the car, has its vertical member depending downwardly, and rollers are provided on my improved side bearing for coöperating with said downwardly-extending flange for the purpose of taking up the side thrust due to the swaying of the car-body. It is of course obvious that these side bearings are arranged on opposite sides of the truck.

6 indicates a casting, which is in the form of a box open at its bottom. This casting has end extensions arranged at an angle in whose lower faces are formed the sockets 2, above referred to. The upper or top wall of the box is provided with a series of openings through which protrude rollers 7, said rollers being mounted upon spindles 8, so that they may rotate independently of each other.

9 indicates lateral lugs or ears, which are perforated for the passage of spindles 10, said spindles being preferably headed at their upper ends and provided with openings in their lower ends for the passage of cotter-pins for well-understood purposes. Upon these spindles 10 are arranged rollers 11, rotating about a vertical axis.

The spindles 8 are radially disposed with respect to the arc of movement of the truck, and the axis of rotation of the rollers 7 is substantially horizontally. These rollers 7 coöperate with the track-plate 4, while the rollers 11 coöperate with the downwardly-extending flange of the angle-iron 3.

I am aware that many minor changes in the construction, arrangement, and combination of the several parts of my device can be made and substituted for those herein shown and described without in the least departing from the nature and principle of my invention.

Having thus described my invention, what I claim as new, and desire to secure by Letters Patent, is—

1. In a side bearing for railway-cars, the combination with spring-posts, of a casting supported upon the upper ends of said posts, and antifriction devices arranged in said casting for supporting the load imparted thereto; substantially as described.

2. In a side bearing for railway-cars, the combination with spring-posts, of a casting carried by the upper ends thereof, antifriction devices arranged in said casting and capable of vertical and lateral contact, and means carried by the car-body for coöperating with said antifriction devices; substantially as described.

3. In a side bearing for railway-cars, the combination with suitable supports, of a casting, rollers mounted within said casting and protruding through the upper wall thereof, and rollers mounted at the sides of the casting for lateral contact; substantially as described.

4. In a side bearing for railway-cars, the combination with a casting, of rollers housed within the casting and protruding through the top wall thereof, perforated lugs or ears projecting from the side of the casting, and rollers mounted between said lugs or ears; substantially as described.

5. In a side bearing for railway-cars, the combination with a casting, of antifriction devices carried thereby and capable of vertical and lateral contact, and angular projections at the ends of the casting, said projections being provided with sockets for receiving the ends of supporting-posts; substantially as described.

6. In a side bearing for railway-cars, the combination with spring-supporting posts, of a casting carried by the upper ends of said posts, rollers mounted in said casting and rotating about horizontal and vertical axes respectively, and an angle-iron on the car-body whose horizontal leg coöperates with one set of rollers and whose vertical leg coöperates with the other set of rollers.

In testimony whereof I hereunto affix my signature, in the presence of two witnesses, this 14th day of April, 1902.

CHARLES F. HUNTOON.

Witnesses:
F. B. BAIRD,
E. G. COATES.